(12) United States Patent
Sacripante et al.

(10) Patent No.: US 6,849,371 B2
(45) Date of Patent: Feb. 1, 2005

(54) TONER PROCESS

(75) Inventors: Guerino G. Sacripante, Oakville (CA); Enno E. Agur, Toronto (CA)

(73) Assignee: Xerox Corporation, Stamford, CT (US)

( * ) Notice: Subject to any disclaimer, the term of this patent is extended or adjusted under 35 U.S.C. 154(b) by 259 days.

(21) Appl. No.: 10/175,246

(22) Filed: Jun. 18, 2002

(65) Prior Publication Data

US 2003/0232268 A1 Dec. 18, 2003

(51) Int. Cl.$^7$ .............................................. C08J 3/215
(52) U.S. Cl. ................... 430/137.14; 523/333; 523/334
(58) Field of Search ................... 430/137.14; 523/333, 523/334

(56) References Cited

U.S. PATENT DOCUMENTS

| | | | |
|---|---|---|---|
| 5,278,020 A | 1/1994 | Grushkin et al. | 430/137 |
| 5,290,654 A | 3/1994 | Sacripante et al. | 430/137 |
| 5,308,734 A | 5/1994 | Sacripante et al. | 430/137 |
| 5,344,738 A | 9/1994 | Kmiecik-Lawrynowicz et al. | 430/137 |
| 5,348,832 A | 9/1994 | Sacripante et al. | 430/109 |
| 5,370,963 A | 12/1994 | Patel et al. | 430/137 |
| 5,593,807 A * | 1/1997 | Sacripante et al. | 430/137.14 |
| 5,604,076 A | 2/1997 | Patel et al. | 430/137 |
| 5,658,704 A | 8/1997 | Patel et al. | 430/137 |
| 5,660,965 A * | 8/1997 | Mychajlowskij et al. | 430/137.14 |
| 5,858,601 A | 1/1999 | Ong et al. | 435/137 |
| 5,863,698 A | 1/1999 | Patel et al. | 430/137 |
| 5,902,710 A | 5/1999 | Ong et al. | 430/110 |
| 5,916,725 A * | 6/1999 | Patel et al. | 430/137.14 |
| 5,925,488 A | 7/1999 | Patel et al. | 430/137 |
| 5,977,210 A | 11/1999 | Patel et al. | 523/161 |
| 6,120,967 A * | 9/2000 | Hopper et al. | 430/137.14 |
| 6,140,003 A * | 10/2000 | Sacripante et al. | 430/108.22 |
| 6,210,853 B1 * | 4/2001 | Patel et al. | 430/137.14 |
| 6,447,974 B1 * | 9/2002 | Chen et al. | 430/137.14 |

OTHER PUBLICATIONS

Grant, Roger et al. Grant and Hackh's Chemical Dictionary. New York: McGraw–Hill, Inc. (1987) p. 212, "emulsion".*

* cited by examiner

Primary Examiner—Christopher Rodee
(74) Attorney, Agent, or Firm—E. D. Palazzo

(57) ABSTRACT

A surfactant-free toner process including coalescing by heating in water a coagulant, a polyester resin emulsion, a wax emulsion stabilized with said polyester emulsion and a colorant dispersion stabilized by said polyester emulsion.

32 Claims, No Drawings

TONER PROCESS

BACKGROUND

The present invention is generally directed to toner processes, and more specifically, the present invention relates to an in situ toner process, also known as a chemical toner process, involving the generation of toner particles directly from resin, colorants and other components, such as a wax, without the use of conventional melt kneading and pulverization techniques. More specifically, the present invention relates to a surfactant free coalescence toner process wherein the toner is comprised of a wax, colorant and resin. In embodiments, the present invention relates to a surfactant free coalescence process wherein a submicron hydrophilic polyester resin emulsion, submicron pigment particles and submicron wax particles, such as for example, from about 5 to about 500 nanometers in diameter, and preferably from about 10 to about 250 nanometers in diameter as determined by a Nicomp particle sizer, are coalesced together by the use of a coagulant, such as an alkali or alkaline earth metal salt, at a temperature above the glass transition temperature of the resin in water to afford a toner composite comprised, for example, of from about 80 to about 85 percent by weight of toner resin, from about 3 to about 15 percent of pigment by weight, from about 1 to about 10 weight percent of colorant, and from about 6 to about 15 percent of wax by weight of toner, wherein the total of these components is about 100 percent, and which toner composite is in the size range of from, for example, about 3 to about 15 microns with a geometric size distribution of from about 1.16 to about 1.35 as determined by the Coulter Counter. In more specific embodiments, the present invention is directed to the economical in situ, chemical or direct preparation of toners derived from a hydrophilic polyester resin emulsion, a wax emulsion stabilized by the hydrophilic polyester resin emulsion, and a pigment dispersion stabilized by the hydrophilic polyester resin emulsion, and wherein there is avoided the use of surfactants by utilizing the hydrophilic polyester resin emulsion to stabilize the wax emulsion and the pigment dispersion The process of the present invention in embodiments enables the utilization of polymers obtained by polycondensation reactions, such as polyesters, and more specifically, the sulfonated polyesters as illustrated in U.S. Pat. Nos. 5,348,832; 5,658,704 and 5,604,076, the disclosures of which are totally incorporated herein by reference, and which polyesters may be selected for low melting toners.

REFERENCES

In U.S. Pat. No. 5,290,654, the disclosure of which is totally incorporated herein by reference, there is illustrated a process for the preparation of toners comprised of dispersing a polymer solution comprised of an organic solvent and a polyester, and homogenizing and heating the mixture to remove the solvent and thereby form toner composites.

Emulsion/aggregation/coalescing processes for the preparation of toners are illustrated in a number of Xerox patents, the disclosures of which are totally incorporated herein by reference, such as U.S. Pat. Nos. 5,290,654, 5,278,020, 5,308,734, 5,370,963, 5,344,738, 5,403,693, 5,418,108, 5,364,729, and 5,346,797. Also of interest may be U.S. Pat. Nos. 5,348,832; 5,405,728; 5,366,841; 5,496,676; 5,527,658; 5,585,215; 5,650,255; 5,650,256; 5,501,935; 5,723,253; 5,744,520; 5,763,133; 5,766,818; 5,747,215; 5,827,633; 5,853,944; 5,804,349; 5,840,462; 5,869,215; 5,910,387; 5,919,595; 5,916,725; 5,902,710; 5,863,698, 5,925,488; 5,977,210 and 5,858,601.

The appropriate processes and components of the above patents may be selected for the present invention in embodiments thereof.

SUMMARY

It is a feature of the present invention to provide an in situ or chemical toner process.

In another feature of the present invention there are provided simple and economical chemical processes for the preparation of a toner composition comprised of a polyester resin, colorant and wax.

In a further feature of the present invention there is provided a process for the preparation of toner size particles in the size range of from about 3 to about 25 microns and/or with a narrow GSD in the range of from about 1.18 to about 1.35.

Also, in another feature of the present invention there is provided a process for the preparation of toner compositions with an average particle volume diameter of from about 1 to about 20 microns, and more specifically, from about 1 to about 9 microns, and with a narrow GSD of from about 1.12 to about 1.30, and preferably from about 1.14 to about 1.25 as measured by a Coulter Counter.

Moreover, in another feature of the present invention there is provided a surfactant-free toner process comprised of the coalescence of a submicron polyester resin emulsion, a submicron wax emulsion and a submicron pigment dispersion stabilized with a hydrophilic polyester emulsion.

In yet another feature of the present invention there is provided a process for the preparation of a submicron wax emulsion stabilized with a hydrophilic polyester resin emulsion.

Also, in yet another feature of the present invention there is provided a process for the preparation of a submicron wax emulsion stabilized with a hydrophilic polyester resin emulsion with diameter sizes of from about 10 to about 400 nanometers, and more specifically, from about 100 to about 250 nanometers.

In a further feature of the present invention there are provided processes for the preparation of submicron pigment dispersions stabilized with a hydrophilic polyester emulsion.

Moreover, in another feature of the present invention there are provided surfactant-free processes comprised of mixing together a hydrophilic polyester resin emulsion, a submicron wax emulsion stabilized with a hydrophilic polyester emulsion, a submicron pigment dispersion stabilized with a hydrophilic polyester emulsion, and heating with stirring to a temperature of from about 55° C. to about 60° C. with the addition of (i) an alkali or (ii) alkali salt to primarily cause the coalescence of the submicron particles to form toner composites; and toner compositions with, for example, low fusing temperatures of from about 110° C. to about 130° C.; excellent blocking characteristics at from about 50° C. to about 60° C., and more specifically, from about 55° C. to about 60° C.; a high projection efficiency, such as from about 75 to about 95 percent efficiency as measured by the Match Scan II spectrophotometer available from Milton-Roy, and with variable gloss, such as from about 1 to about 90, as measured by the Gardner Gloss metering unit.

Aspects of the present invention relate to a process comprised of coalescing by heating in water a coagulant, a polyester resin emulsion, a wax emulsion stabilized with the polyester emulsion and a colorant dispersion stabilized by the polyester emulsion; a process wherein the polyester of the emulsion is a hydrophilic sulfonated polyester resin of the formula

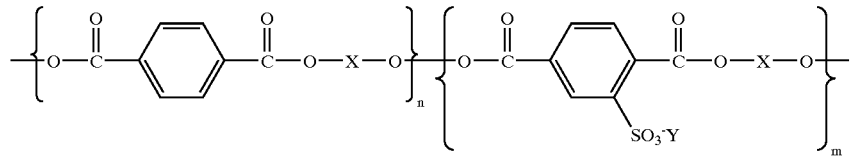

wherein Y is an alkali metal; X is selected from the group consisting of an alkylene, an oxy alkylene, and the like; and n and m represent the number of segments; a process wherein each of n and m represent a number of from about 3,000 to about 7,000, or from about 4,000 to about 6,000; process wherein the wax is a Carnauba wax, a paraffin wax, a montan wax, a microcrystalline polyethylene wax, a polybutylene wax, a polyethylene-acrylic wax, a polyester wax, a polyamide wax, a known Fischer-Tropasch wax, or mixture thereof; a process wherein each of the alkylene and the oxyalkylene contains from about 2 to about 20 carbon atoms; a process wherein the Y alkali is sodium, lithium, potassium, rubidium, cesium, hydrogen or mixtures thereof; a process wherein the coagulant is selected from the group comprised of sodium chloride, sodium bromide, sodium iodide, sodium fluoride, sodium acetate, sodium acetoacetate, lithium chloride, lithium bromide, lithium iodide, lithium fluoride, lithium acetate, lithium acetoacetate, potassium chloride, potassium bromide, potassium iodide, potassium fluoride, acetate, potassium acetoacetate, rubidium bromide, rubidium chloride, rubidium iodide, rubidium fluoride, rubidium acetate, rubidium acetoacetate, cesium bromide, cesium chloride, cesium iodide, cesium fluoride, cesium acetate, cesium acetoacetate, bromide, chloride, iodide, fluoride, acetate, acetoacetate, beryllium bromide, beryllium chloride, beryllium iodide, beryllium fluoride, beryllium acetate, beryllium acetoacetate, magnesium bromide, magnesium chloride, magnesium iodide, magnesium fluoride, magnesium acetate, magnesium acetoacetate, calcium bromide, magnesium chloride, magnesium iodide, magnesium fluoride, magnesium acetate, magnesium acetoacetate, barium bromide, barium chloride, barium iodide, barium fluoride, barium acetate, barium acetoacetate, strontium bromide, strontium chloride, strontium iodide, strontium fluoride, strontium acetate, strontium acetoacetate, zinc bromide, zinc chloride, zinc iodide, zinc fluoride, zinc acetate, zinc acetoacetate, copper bromide, copper chloride, copper iodide, copper fluoride, copper acetate, copper acetoacetate, manganese bromide, manganese chloride, manganese iodide, manganese fluoride, manganese acetate, manganese acetoacetate, chromium bromide, chromium chloride, chromium iodide, chromium fluoride, chromium acetate, chromium acetoacetate, iron bromide, iron chloride, iron iodide, iron fluoride, iron acetate, iron acetoacetate, vanadyl bromide, vanadyl chloride, vanadyl iodide, vanadyl fluoride, vanadyl acetate, vanadyl acetoacetate, and optionally mixtures thereof; a process wherein the colorant is a cyan, black, magenta, yellow dispersion or mixtures thereof with from about 20 to about 60 weight percent solids; a process wherein the colorant is carbon black; a process wherein the colorant is a dye; a process wherein the colorant is a pigment; a process wherein the colorant is comprised of a mixture of a pigment and a dye; a process wherein the polyester possesses a size diameter of from about 10 to about 500 nanometers, and wherein the polyester is copoly(1,2-propylene-dipropylene-5-sulfoisophthalate)-copoly(1,2-propylene-dipropylene terephthalate), the magnesium salt of copoly(1,2-propylene-diethylene-5-sulfoisophthalate)-copoly(1,2-propylene-diethylene terephthalate), the calcium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), and the like optionally including mixtures thereof; a process wherein heating is accomplished at a temperature of from about 50° C. to about 95° C.; a process wherein the polyester emulsion is prepared by heating the sulfonated polyester in water at a temperature of from about 75° C. to about 95° C.; a process wherein the toner is isolated, filtered, washed, and dried; a process wherein the coagulant is added over a period of about 2 to about 8 hours; a process wherein the wax dispersion stabilized by the polyester emulsion is obtained by homogenizing at from about 1,000 pounds per square inch to about 8,000 pounds per square inch for a duration of about 30 to about 90 minutes the wax with an emulsion solution of a hydrophilic polyester resin, and which resin is selected in an amount of about 5 to about 10 percent by weight of wax; a process wherein the colorant dispersion stabilized by the polyester emulsion is obtained by homogenizing at 1,000 pounds per square inch to 8,000 pounds per square inch the colorant with an emulsion solution of a hydrophilic polyester resin and which resin is selected in an amount of about 5 to about 10 percent by weight of wax; a process wherein the colorant dispersion possesses minimum or substantially no agglomeration, or settling of colorant; a process wherein the wax dispersion stabilized by the polyester emulsion possesses a particle size diameter of about 5 to about 500 nanometers; a process wherein the polyester emulsion possesses a particle size diameter of from about 5 to about 300 nanometers; a process wherein the toner obtained possesses a particle size volume average diameter of from about 3 to about 9 microns; a process wherein the polyester is selected from the group consisting of sodio copoly(1,2-propylene-dipropylene-5-sulfoisophthalate)-copoly (1,2-propylene-dipropylene terephthalate), lithio copoly(1,2-propylene-diethylene-5-sulfoisophthalate)-copoly(1,2-propylene-diethylene terephthalate), potasio copoly(1,2-dipropylene-5-sulfoisophthalate)-copoly(1,2-propylene terephthalate), sodio copoly(1,3-butylene-5-sulfoisophthalate)-copoly(1,3-butylene terephthalate), lithio copoly(1,2-dipropylene-5-sulfoisophthalate)-copoly(1,2-propylene terephthalate), potasio copoly(1,3-butylene-5-sulfoisophthalate)-copoly(1,3-butylene terephthalate), sodio copoly(1,2-propylene-diethylene-5-sulfoisophthalate)-copoly(1,2-propylene-diethylene terephthalate), lithio copoly(1,2-dipropylene-5-sulfo isophthalate)-copoly(1,2-propylene terephthalate), potasio copoly(1,3-butylene-5-sulfoisophthalate)-copoly(1,3-butylene terephthalate), and sodio copoly(1,2-dipropylene-5-sulfoisophthalate)-copoly(1,2-propylene terephthalate), potasio copoly(1,3-butylene-5-sulfoisophthalate)-copoly(1,3-butylene terephthalate); a process wherein the polyester resin has a number average molecular weight of from about 2,000 to about 100,000 grams per mole, a weight average molecular weight of from about 4,000 to about 300,000 gram per mole, and a polydispersity of from about 2 to about 30; a process wherein the polyester resin has a glass transition temperature of from about 45° C. to about 70° C.; a process wherein alkylene is ethylene, propylene, or butylene; a process wherein each of n and m are from about 20 to about 10,000, and wherein n represents from about 90 to about 98 percent of the total of the sum of n plus m, and m represents from about 3 to about 10 percent of the total of the sum of n plus m; a process wherein oxyalkylene is ethylene oxy ethylene, propylene oxy propylene, or butylene oxy butylene; a process wherein the polyester is the sodio salt of (1,2-propylene-dipropylene-5-sulfoisophthalate)-copoly(1,2-propylene-dipropylene terephthalate); a process comprised of (i) generating an emulsion of hydrophilic polyester resin by heating the resin in water at a temperature of from about 75° C. to about 95° C.; (ii) generating a submicron wax dispersion stabilized with a hydrophilic polyester resin emulsion obtained with a Gaulin 15MR homogenizer; (iii) generating a submicron pigment emulsion stabilized with a hydrophilic polyester resin emulsion obtained with a Rannie Lab 2000 homogenizer; (iv) mixing the wax, pigment dispersion and the hydrophilic polyester emulsion, and heating the mixture to a temperature of from about 50° C. to about 65° C. with stirring, of from about 100 to about 400 revolutions per minute stirring speed; (v) adding thereto an aqueous solution of a coagulant comprised, for example, of a metal salt, such as for example a monovalent or multivalent metal ion of lithium, sodium, potassium, rubidium, cesium, beryllium, magnesium, calcium, barium, strontium, scandium, yttrium, lutetium, titanium, zirconium, hafnium, vanadium, chromium, niobium, tantalum, molybdenum, tungsten, manganese, rhenium, iron, ruthenium, osmium, cobalt, rhodium, iridium, nickel, palladium, copper, platinum, silver, gold, zinc, cadmium, mercury, aluminum, or mixtures thereof, and causing the coalescence of the submicron polyester emulsion, pigment and wax thereby resulting in a toner composite diameter size of from about 3 to about 25 microns; (vi) cooling the toner composite to room temperature, about 20° C., followed by isolation, filtration, washing and drying; a toner process comprised of (i) generating an emulsion of a hydrophilic polyester resin, present, for example, in an amount of from about 500 grams in 2 liters of water by heating the mixture at, for example, from about 75° C. to about 95° C., and thereby forming an emulsion solution of submicron particles in the size range of, for example, from about 5 to about 40 nanometers; (ii) preparing a colorant dispersio, such as Pigment Blue 15:3, available from Sun Chemical Corporation, present in an amount of, for example, from about 3 to about 5 percent by weight of toner, and mixing the pigment with an emulsion of a hydrophilic polyester resin present, for example, in an amount of from about 5 percent by weight of pigment and water by predispersing the mixture with an IKA Ultra Turrax® T50 homogenizer and homogenizing the mixture at 15 megapascals for 30 passes with a Rannie Lab 2000 homogenizer; (iii) preparing a wax emulsion, such as Carnauba Wax or Polywax 725, available from Petrolite Chemicals, in an amount of, for example, from about 6 to about 9 percent by weight of toner, and homogenizing the wax with an emulsion solution of a hydrophilic polyester resin present, for example, in an amount of from about 5 percent by weight of wax, and water by pre-emulsification for about 30 minutes at 55 megapascals and emulsifying for 60 minutes at 8,000 psi, utilizing a Gaulin 15MR homogenizer; (iv) mixing the above wax emulsion, pigment dispersion and hydrophilic polyester emulsion, and heating to a temperature of from about 50° C. to about 65° C. with stirring at a speed of from about 100 to about 400 revolutions per minute; (v) adding thereto an aqueous solution of a coagulant comprised of a metal salt, such as for example a monovalent or multivalent metal ion of lithium, sodium, potassium, rubidium, cesium, beryllium, magnesium, calcium, barium, strontium, scandium, yttrium, lutetium, titanium, zirconium, hafnium, vanadium, chromium, niobium, tantalum, molybdenum, tungsten, manganese, rhenium, iron, ruthenium, osmium, cobalt, rhodium, iridium, nickel, palladium, copper, platinum, silver, gold, zinc, cadmium, mercury, aluminum, or mixtures thereof.

Also, in embodiments of the present invention, there is provided a process for the stabilization and generation of a wax emulsion stabilized with a hydrophilic polyester resin emulsion, obtained by utilizing a Gaulin 15MR homogenizer (APV Homogenizer Group, Wilmington, Mass.) and a stainless steel jacketed reactor with steam heating and water cooling capability. The wax, sulfonated polyester resin emulsion and deionized water are mixed together in the reactor. The mixture is stirred and heated to a temperature higher than the peak melting point of the wax to melt the wax; typically, a desired melting temperature is about 10° C. or higher than the peak melting point of the wax, including heating the mixture to above about 100° C. Once the desired temperature is achieved, the mixture is pumped through a homogenizer, which homogenizer has two valves in series, a primary valve that operates at high pressure up to about 55 megapascals during homogenization, and a secondary valve that operates at lower pressures up to about 7 megapascals. Initially, the homogenizer is operated in a pre-emulsification mode where the primary valve is fully open and the secondary valve is partially closed to generate a pressure drop of about 5 to about 7 megapascals. The wax mixture is pre-emulsified for a desired period of time, up to about 8 theoretical passes (time for one theoretical pass is defined by the mixture volume divided by the volumetric flow rate through the homogenizer). For a 4 liter mixture pumped at 1 liter per minute, one theoretical pass takes about 4 minutes. After pre-emulsification, the primary valve is partially closed to increase the homogenizer pressure to a desired pressure in the range of from about 20 megapascals to about 55 megapascals. Emulsification can be accomplished for a number of theoretical passes such as from about 5 to about 15 passes. After completion of emulsification, the homogenizer is disengaged and the wax emulsion in the reactor is cooled to room temperature, discharged into a product container and filtered through a filter bag (typically having about 1 to about 50 micron pore size). The emulsion product is analyzed for total solids content using a Sartorius MA 30 moisture analyzer, and average particle size and particle size distribution using the Microtrac UPAL50 particle size analyzer.

Further in embodiments of the present invention, there is provided a process for the stabilization and generation of a pigment dispersion stabilized utilizing a hydrophilic polyester resin emulsion obtained by utilizing a Rannie Lab 2000 homogenizer (APV Homogenizer Group, Wilmington, Mass.); the pigment (usually in the form of a dry powder), sulfonated polyester resin (usually in the form of a dilute aqueous solution) and deionized water are mixed together in a vessel; the pigment mixture is first stirred with a mechanical stirrer to wet the dry pigment powder; then the pigment mixture is predispersed with a homogenizer, such as an IKA Ultra Turrax T50 homogenizer (IKA Labortechnik, Germany); alternatively, the predispersion can be effected with an attritor, such as the Union Process Type 01 lab attritor (Union Process, Akron, Ohio); the predispersed mixture is then pored into the feed hopper and pumped through the homogenizer; the homogenizer has two valves in series, a primary valve that operates at high pressure up to 200 megapascals during homogenization and a secondary valve that operates at lower pressures up to about 20 megapascals. For the first pass through the homogenizer, the primary valve is partially closed to generate a pressure drop through the valve of about 33 percent of the final operating pressure; for the second pass through the homogenizer, the primary valve is further closed to generate a pressure drop through the valve of about 67 percent of the final operating pressure; for the third and subsequent passes through the homogenizer, the primary valve is further closed to generate a final pressure drop through the valve in the range of from about 50 to about 200 megapascals, and more specifically, from about 100 to about 150 megapascals; the flow rate of the pigment mixture through the homogenizer is about 5 to about 15 liters per hour, and more specifically, about 10 to about 12 liters per hour; and the homogenized pigment mixture exiting from the homogenizer is collected in a cooled product vessel. When the feed hopper containing the feed pigment mixture is nearly empty, the cooled product is poured into the feed hopper for a subsequent pass through the homogenizer; the homogenization is accomplished for a number of passes ranging from about 5 to about 40 passes, and more specifically, from about 10 to about 30 passes; operating at a higher pressure for a greater number of passes results in a smaller pigment particle size and narrower particle size distribution in the product. After the dispersion completion aspect, the homogenizer is dispersed and the pigment dispersion in the product vessel is cooled to room temperature; optionally, the product is filtered through a filter bag (typically having about 1 to about 50 micron pore size). The dispersion product is analyzed for total solids content using a Sartorius MA 30 moisture analyzer, and average particle size and particle size distribution using the Microtrac UPA150 particle size analyzer.

Moreover, disclosed herein is a toner process comprising, for example, the coalescence of a colorant, wax and an emulsion of a sulfonated polyester, especially a sodio sulfonated polyester resin with a coalescence or coagulant agent comprised, for example, of a divalent salt of the Group II elements, such as magnesium, calcium, beryllium, the barium salts of chloride, bromide, iodide, acetate, or alkylate; or forming a core comprised of a colorant and first polyester resin comprised of an alkali (II) ionically complexed sulfonated polyester resin; followed by the formation of a shell comprised of second polyester resin obtained, for example, by the addition of an emulsion solution of a polyester, especially a sodio sulfonate polyester and a coalescence agent comprised of a metal salt of the transition metals of Groups III to XII, such as for example zinc, copper, cadmium, manganese, vanadium, iron, cobalt, chromium, niobium, zirconium, nickel and the like. In embodiments, the toner composites or compositions obtained display an average volume diameter of, for example, from about 1 to about 25, and preferably from 1 to about 10 microns, and a narrow GSD of, for example, from about 1.16 to about 1.26 or about 1.18 to about 1.28 as measured on the Coulter Counter; a low fixing temperature of, for example, from about 110° C. to about 130° C., and wherein the gloss level of a fused image can be controlled by the proper selection of the core and shell. For example, for black or highlight color imaging applications, low gloss levels of from about 0 to about 15 as measured by the known Gardner gloss device can be achievable.

Illustrative examples of polyesters include, for example, a sulfonated polyester resin as illustrated, for example, in U.S. Pat. Nos. 5,348,832; 5,853,944; 5,840,462; 5,660,965; 5,658,704; 5,648,193; and 5,593,807; the disclosures of each patent being totally incorporated herein by reference, and for example, wherein the polyester is of the formula

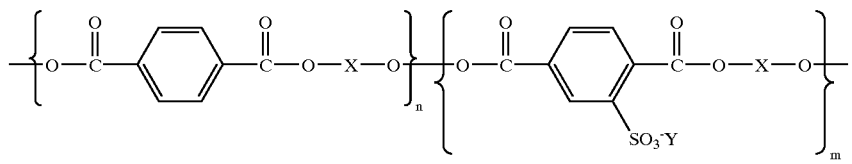

wherein Y is an alkali metal for the first polyester, such as sodium; X is an alkylene, and n and m represent the number of segments, and wherein each is, for example, a number of about 5 to about 5,000, and more specifically, from about 1,000 to about 2,000, and wherein the weight average molecular weight of the polyester is, for example, from about 2,000 grams per mole to about 100,000 grams per mole, and more specifically, from about 4,000 to about 70,000 grams per mole; the number average molecular weight is from about 1,000 grams per mole to about 50,000 grams per mole, and more specifically, from about 2,000 to about 20,000 grams per mole, and the polydispersity thereof is, for example, from about 2 to about 18, and more specifically, from about 2 to about 7, as measured by gel permeation chromatography. The resin is then heated in water to a temperature of, for example, from about 75° C. to about 95° C. with stirring to form an aqueous dispersion of the sodio sulfonated polyester resin emulsion in water with an emulsion solids content of from about 5 to about 35 percent by weight of water, and preferably from about 12 to about 20 percent by weight of water.

The alkali (II) salts that can be selected to coalesce the generated sodio sulfonated polyester emulsion with a colorant to enable the formation of the core composite can be selected from the alkali (II) groups, such as beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, strontium sulfate, barium chloride, barium bromide, barium iodide, or mixtures thereof; and the concentration thereof is in the range of, for example, from about 0.1 to about 5 weight percent of water. It is believed that the divalent alkali (II) metal ion exchanges with the monovalent sodium ion of the sulfonated polyester resin emulsion, thus coalescing the emulsion particles; and wherein the formula of the polyester resin is

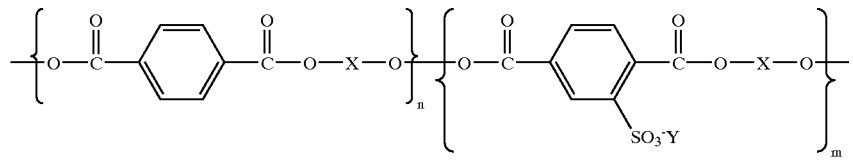

wherein Y is an alkali (II) metal, such as a magnesium ($Mg^{++}$), beryllium ($Be^{++}$), calcium ($Ca^{++}$); X is as indicated herein; and n and m represent the number of segments of about 10 to about 1,000 each, and wherein the weight average molecular weight is from about 2,000 grams per mole to about 100,000 grams per mole, the number average molecular weight is from about 1,000 grams per mole to about 50,000 grams per mole, and the polydispersity is from about 2 to about 18 as measured by gel permeation chromatography.

Polyester examples are as indicated herein, and more specifically, examples of a number of polyesters are the beryllium salt of copoly(1,2-propylene-dipropylene-5-sulfoisophthalate)-copoly(1,2-propylene-dipropylene terephthalate), the barium salt of copoly(1,2-propylene-diethylene-5-sulfoisophthalate)-copoly(1,2-propylene-diethylene terephthalate), the magnesium salt of copoly(1,2-dipropylene-5-sulfoisophthalate)-copoly(1,2-propylene terephthalate), the magnesium salt of copoly(1,3-butylene-5-sulfoisophthalate)-copoly(1,3-butylene terephthalate), the calcium salt of copoly(1,2-dipropylene-5-sulfoisophthalate)-copoly(1,2-propylene terephthalate), the calcium salt of copoly(1,3-butylene-5-sulfoisophthalate)-copoly(1,3-butylene terephthalate), the cobalt salt of copoly(1,2-propylene-diethylene-5-sulfo isophthalate)-copoly(1,2-propylene-diethylene terephthalate), the nickel salt of copoly(1,2-dipropylene-5-sulfoisophthalate)-copoly(1,2-propylene terephthalate), the iron salt of copoly(1,3-butylene-5-sulfoisophthalate)-copoly(1,3-butylene terephthalate), the zirconium salt of copoly(1,2-dipropylene-5-sulfo isophthalate)-copoly(1,2-propylene terephthalate), the chromium salt of copoly(1,3-butylene-5-sulfoisophthalate)-copoly(1,3-butylene terephthalate), and the like.

Examples of transition metal salts that can be selected to coalesce the sulfonated polyester emulsion, wax emulsion and pigment dispersion are, more specifically, selected from the zinc, chromium, manganese, iron, cobalt, nickel, copper, zirconium, niobium, cadmium, and ytterbium halides, such as chloride, bromide, iodide, or anions, such as acetates, acetoacetates, sulfates of vanadium, niobium, tantalum, chromium, molybdenum, tungsten, manganese, iron, ruthenium, cobalt, nickel, copper, zinc, cadmium, silver; aluminum salts, such as aluminum acetate, aluminum poly-aluminum chloride, aluminum halides, mixture thereof and the like, and wherein the concentration thereof is optionally in the range of from about 0.1 to about 5 weight percent by weight of water. It is believed, while not being desired to be limited by theory throughout, that the transition metal ion exchanges with the monovalent sodium ion of the sulfonated polyester resin emulsion, thus coalescing the emulsion particles, and wherein the formula of the second polyester shell resin is illustrated as in the above formula, and wherein Y is, more specifically, zinc ($zn^{++}$), vanadium ($V^{+++}$), or multivalent ions of niobium tantalum, chromium, molybdenum, tungsten, manganese, iron, ruthenium, cobalt, nickel, copper, zinc, cadmium, silver, aluminum ($Al^{+++}$), present in an amount of from about 0.1 to about 10 weight percent of the toner components, and preferably from about 0.5 to about 5 weight percent of the toner.

Various known colorants, especially pigments, present in the toner in an effective amount of, for example, from about 1 to about 65, more specifically, from about 2 to about 35 percent by weight of the toner, and even more specifically, in an amount of from about 1 to about 15 weight percent, include carbon black like REGAL 330®; magnetites, such as Mobay magnetites MO8029™, MO8060™, and the like. As colored pigments, there can be selected known cyan, magenta, yellow, red, green, brown, blue or mixtures thereof. Specific examples of colorants, especially pigments, include phthalocyanine HELIOGEN BLUE L6900™, D6840™, D7080™, D7020™, cyan 15:3, magenta Red 81:3, Yellow 17, the pigments of U.S. Pat. No. 5,556,727, the disclosure of which is totally incorporated herein by reference, and the like. Examples of specific magentas that may be selected include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of specific cyans that may be selected include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative specific examples of yellows that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as pigments with the process of the present invention. The colorants, such as pigments, selected can be flushed pigments as indicated herein.

More specifically, colorant examples include Pigment Blue 15:3 having a Color Index Constitution Number of 74160, magenta Pigment Red 81:3 having a Color Index Constitution Number of 45160:3, and Yellow 17 having a Color Index Constitution Number of 21105, and known dyes such as food dyes, yellow, blue, green, red, magenta dyes, and the like. Colorants include pigments, dyes, mixtures of pigments, mixtures of dyes, and mixtures of dyes and pigments, and the like, and preferably pigments.

Waxes present in the toner in an effective amount of, for example, from about 1 to about 15, and more specifically, from about 3 to about 9 percent by weight of the toner, include both natural or synthetic waxes. Examples of natural waxes are selected from the group consisting of Carnauba wax, Paraffin wax, Montan Wax, or microcrystalline wax and the like. Examples of synthetic waxes include polyethylene waxes, polybutylene waxes, polyethylene-acrylic waxes, polyester waxes, polyamide waxes, Fischer-Tropasch waxes, which are available from Michelman Performance Additives or Petrolite, polypropylene waxes, and mixtures thereof.

The toner may also include known charge additives in effective amounts of, for example, from about 0.1 to about 5 weight percent, such as alkyl pyridinium halides, bisulfates, the charge control additives of U.S. Pat. Nos. 3,944,493; 4,007,293; 4,079,014; 4,394,430 and 4,560,635, the disclosures of which are totally incorporated herein by reference, negative charge enhancing additives like aluminum complexes, and the like.

Surface additives that can be added to the toner compositions, preferably after washing or drying, include, for example, metal salts, metal salts of fatty acids, emulsion silicas, metal oxides like titanium, tin and the like, mixtures thereof, and the like, which additives are usually present in an amount of from about 0.1 to about 2 weight percent, reference U.S. Pat. Nos. 3,590,000; 3,720,617; 3,655,374 and 3,983,045, the disclosures of which are totally incorporated herein by reference. Preferred additives include zinc stearate and flow aids, such as fumed silicas like AEROSIL R972® available from Degussa, or silicas available from Cabot Corporation or Degussa Chemicals, each in amounts of from about 0.1 to about 2 percent, which can be added during the aggregation process or blended into the formed toner product.

Developer compositions can be prepared by mixing the toners obtained with the processes of the present invention with known carrier particles, including coated carriers, such as steel, ferrites, and the like, reference U.S. Pat. Nos. 4,937,166 and 4,935,326, the disclosures of which are totally incorporated herein by reference, for example from about 2 percent toner concentration to about 8 percent toner concentration.

Imaging methods are also envisioned with the toners of the present invention, reference for example a number of the patents mentioned herein, and U.S. Pat. No. 4,265,990, the disclosure of which is totally incorporated herein by reference.

The following Examples are being submitted to further define various species of the present invention. These Examples are intended to be illustrative only and are not intended to limit the scope of the present invention. Also, parts and percentages are by weight unless otherwise indicated.

EXAMPLE I
Preparation of Sodio Sulfonated Polyesters:

A linear sulfonated random copolyester resin comprised of, on a mol percent, 0.465 of terephthalate, 0.035 of sodium sulfoisophthalate, 0.475 of 1,2-propanediol, and 0.025 of diethylene glycol was prepared as follows. In a 5 gallon Parr reactor equipped with a bottom drain valve, double turbine agitator, and distillation receiver with a cold water condenser were charged 3.98 kilograms of dimethylterephthalate, 451 grams of sodium dimethyl sulfoisophthalate, 3.104 kilograms of 1,2-propanediol (1 mole excess of glycol), 351 grams of diethylene glycol (1 mole excess of glycol), and 8 grams of butyltin hydroxide oxide catalyst. The reactor was then heated to 165° C. with stirring for 3 hours whereby 1.33 kilograms of distillate were collected in the distillation receiver, and which distillate was comprised of about 98 percent by volume of methanol and 2 percent by volume of 1,2-propanediol as measured by the ABBE refractometer available from American Optical Corporation. The reactor mixture was then heated to 190° C. over a one hour period, after which the pressure was slowly reduced from atmospheric pressure to about 260 Torr over a one hour period, and then reduced to 5 Torr over a two hour period with the collection of approximately 470 grams of distillate in the distillation receiver, and which distillate was comprised of approximately 97 percent by volume of 1,2-propanediol and 3 percent by volume of methanol as measured by the ABBE refractometer. The pressure was then further reduced to about 1 Torr over a 30 minute period whereby an additional 530 grams of 1,2-propanediol were collected. The reactor was then purged with nitrogen to atmospheric pressure, and the polymer product discharged through the bottom drain onto a container cooled with dry ice to yield 5.60 kilograms of 3.5 mol percent of the sulfonated polyester resin sodio salt of (1,2-propylene-dipropylene-5-sulfoisophthalate)-copoly(1,2-propylene-dipropylene terephthalate). The sulfonated polyester resin glass transition temperature was measured to be 56.6° C. (onset) utilizing the 910 Differential Scanning Calorimeter available from E.I. DuPont operating at a heating rate of 10° C. per minute. The number average molecular weight was measured to be 3,250 grams per mole, and the weight average molecular weight was measured to be 5,290 grams per mole using tetrahydrofuran as the solvent.

EXAMPLE II
Preparation of a Sodio Sulfonated Polyester Emulsion Solution I:

A 12 percent of emulsion of the above generated sulfonate polyester resin was prepared by first heating about 2 liters of water to about 85° C. with stirring, and adding thereto 240 grams of the sulfonated polyester resin obtained above in Example I, followed by continued heating at about 85° C., and stirring of the mixture for a duration of from about one to about two hours, followed by cooling to about room temperature, about 22° C. to 25° C. throughout the Examples. The emulsion had a characteristic blue tinge and a resin particle size diameter in the range of from about 5 to about 150 nanometers as measured by the Nicomp particle sizer.

EXAMPLE III
Preparation of a Wax Emulsion:

2,882 Grams of deionized water, 158.33 grams of the sulfonated polyester emulsion resin solution of Example II containing about 19 grams of sulfonated polyester resin, and 760 grams of POLYWAX® 725 polyethylene wax (Baker Petrolite, USA) having an onset and peak melting point of about 80° C. and about 103° C., respectively, were charged into a 1 gallon reactor. The reactor feed port was closed and the reactor agitator was started at about 400 revolutions per minute. The wax mixture was heated by means of steam heating in the reactor jacket to a set temperature of about 132° C. to melt the wax. When the set temperature was reached, the discharge valve to the Gaulin 15MR homogenizer (APV Homogenizer Group, USA) was opened and the homogenizer was turned on to pump the wax mixture through the homogenizer. Initially, the homogenizer primary valve was kept open and the secondary valve was partially closed to generate a pressure drop of about 7 megapascals through the valve as read from a pressure gauge mounted on the homogenizer and to pre-emulsify the wax mixture for about 30 minutes. Then the homogenizer primary valve was partially closed to generate a pressure drop of about 55 megapascals through the valve to emulsify the pre-emulsified wax mixture for about 60 minutes. During pre-emulsification and emulsification, the wax mixture temperature as measured in the reactor with a thermocouple was maintained at about 132° C. At the completion of emulsification, the homogenizer primary and secondary valves were opened, the homogenizer disengaged, the emulsified product in the reactor was cooled by means of water cooling in the reactor jacket to a safe temperature of less than about 40° C., discharged from the reactor into a container and filtered through a 5 micron pore size polypropylene filter bag. The resulting product was comprised of a stabilized wax emulsion comprising about 23.8 percent by weight polyethylene wax and sulfonated polyester resin as measured gravimetrically utilizing a hot plate where the ratio of the resin to wax was about 2.5 parts per hundred as determined by liquid chromatography, capillary electrophoresis and gas chromatography. The wax particles of the emulsion possessed a volume median diameter of about 424 nanometers and volume 90th percentile diameter of about 751 nanometers as determined by a Microtrac UPA150 particle size analyzer.

EXAMPLE IV

Preparation of Wax Emulsion II:

2,716.25 Grams of deionized water, 318.75 grams of the sulfonated polyester emulsion resin solution of Example II containing about 38.25 grams of the sulfonated polyester resin, and 765 grams of Licowax S montan wax (Baker Clariant, USA) having an onset and peak melting point of about 66° C. and about 82° C., respectively, were charged into a 1 gallon reactor. The reactor feed port was closed and the reactor agitator was engaged at about 400 revolutions per minute. The wax mixture was heated by means of steam heating in the reactor jacket to a set temperature of about 108° C. to melt the wax. When the set temperature had been reached, the discharge valve to the Gaulin 15MR homogenizer (APV Homogenizer Group, USA) was opened and the homogenizer was rendered operational to pump the wax mixture through the homogenizer. Initially, the homogenizer primary valve was kept open and the secondary valve was partially closed to generate a pressure drop of about 7 megapascals through the valve as read from a pressure gauge mounted on the homogenizer and to pre-emulsify the wax mixture for about 30 minutes. Then the homogenizer primary valve was partially closed to generate a pressure drop of about 55 megapascals through the valve to emulsify the pre-emulsified wax mixture for about 60 minutes. During pre-emulsification and emulsification, the wax mixture temperature as measured in the reactor with a thermocouple was maintained at about 108° C. At the completion of emulsification, the homogenizer primary and secondary valves were opened, the homogenizer was turned off, the emulsified product in the reactor was cooled by means of water cooling in the reactor jacket to a safe temperature of about 35° C., discharged from the reactor into a product contained, and filtered through a 5 micron pore size polypropylene filter bag.

The product was comprised of a stabilized wax emulsion comprising about 19.25 percent by weight of montan wax and about 81.75 weight percent of sulfonated polyester resin as measured gravimetrically utilizing a hot plate where the ratio of the resin to wax was about 5 parts per hundred as determined by liquid chromatography, capillary electrophoresis and gas chromatography. The wax particles of emulsion had a volume median diameter of about 279 nanometers and a volume 90th percentile diameter of about 368 nanometers as determined by a Microtrac UPA150 particle size analyzer.

EXAMPLE V

Preparation of a Wax Emulsion III:

2,723 Grams of deionized water, 316.67 grams of the sulfonated polyester emulsion resin solution of Example II containing about 38 grams of sulfonated polyester resin, and 760 grams of RC-160 Carnauba wax (Toa Kasei, Japan) having an onset and peak melting point of about 69° C. and about 84° C., respectively, were charged into a 1 gallon reactor. The reactor feed port was closed and the reactor agitator was started at about 400 revolutions per minute. The wax mixture was heated by means of steam heating in the reactor jacket to a set temperature of about 110° C. to melt the wax. When the set temperature was reached, the discharge valve to the Gaulin 15MR homogenizer (APV Homogenizer Group, USA) was opened and the homogenizer was turned on to pump the wax mixture through the homogenizer. Initially, the homogenizer primary valve was kept open and the secondary valve was partially closed to generate a pressure drop of about 7 megapascals through the valve as read from a pressure gauge mounted on the homogenizer and to pre-emulsify the wax mixture for about 30 minutes. Then the homogenizer primary valve was partially closed to generate a pressure drop of about 55 megapascals through the valve to emulsify the pre-emulsified wax mixture for about 60 minutes. During pre-emulsification and emulsification, the wax mixture temperature as measured in the reactor with a thermocouple was maintained at about 110° C. At the completion of emulsification, the homogenizer primary and secondary valves were opened, the homogenizer was turned off, the emulsified product in the reactor was cooled by means of water cooling in the reactor jacket to a safe temperature of about 30° C., discharged from the reactor into a product container, and filtered through a 5 micron pore size polypropylene filter bag.

The product was comprised of a stabilized wax emulsion comprising about 19.5 percent by weight of Carnauba wax and 81.75 weight percent of the sulfonated polyester resin as measured gravimetrically utilizing a hot plate where the ratio of the resin to wax was about 5 parts per hundred as determined by liquid chromatography, capillary electrophoresis and gas chromatography. The wax particles of the emulsion had a volume median diameter of about 271 nanometers and a volume 90th percentile diameter of about 433 nanometers as determined by a Microtrac UPA150 particle size analyzer.

EXAMPLE VI

Preparation of a Cyan Pigment Dispersion I:

360 Grams of Pigment Blue 15:3 powder (Dainichiseika Color & Chemicals, Japan), 540 grams of the sulfonated polyester emulsion resin solution of Example II containing about 64.8 grams of sulfonated polyester resin, and 300 grams of deionized water were dispensed into a beaker and stirred with the aid of a mechanical stirrer to mix the dry pigment powder, water and the sulfonated polyester emulsion resin solution mixture. The resultant pigment mixture was predispersed for about 5 minutes using an IKA Ultra Turrax® T50 homogenizer (IKA Labortechnik, Germany) operating at a speed starting at about 1,000 revolutions per minute and ending at about 5,000 revolutions per minute. The resulting predispersed pigment mixture was then poured into the feed hopper of a Rannie Lab 2000 homogenizer (APV Homogenizer Group, USA). The homogenizer was turned on to pump the pigment mixture through the homogenizer at a rate of about 11 liters per hour. The product was collected in a product container wherein the container was cooled by means of an ice bath. Initially, the homogenizer primary and secondary valves were kept fully open. When the pigment mixture was being pumped steadily through the homogenizer, the homogenizer primary valve was partially closed to increase the pressure drop in the valve to about 50 megapascals. When the feed hopper was nearly empty, the homogenized product in the product container was poured back into the feed hopper, and the homogenizer primary valve was further closed to increase the pressure drop in the valve to about 100 megapascals. When the feed hopper was nearly empty, the homogenized product in the product container was poured back into the feed hopper, and the homogenizer primary valve was further closed to increase the pressure drop in the valve to a final set point of about 150 megapascals. In total, the pigment mixture was pumped through the homogenizer 18 times at 150 megapascals pressure. At the completion of homogenization, the homogenizer primary valve was opened and the homogenizer was disengaged.

The product was comprised of a stabilized pigment dispersion comprising about 35.1 percent by weight of Pigment Blue 15:3 pigment and about 64.9 percent by weight of sulfonated polyester resin as measured gravimetrically utilizing a hot plate where the ratio of the resin to pigment being about 18 parts per hundred as determined by liquid chromatography, capillary electrophoresis and gas chromatography. The pigment particles of the dispersion had a volume median diameter of about 121 nanometers and volume 90th percentile diameter of about 223 nanometers as determined by a Microtrac UPA150 particle size analyzer.

EXAMPLE VII
Preparation of a Magenta Pigment Dispersion I:
240 Grams of Pigment Red 122 powder (Dainichiseika Color & Chemicals, Japan), 360 grams of the sulfonated polyester emulsion resin solution of Example II containing about 43.2 grams of sulfonated polyester resin, and 600 grams of deionized water were dispensed into a beaker and stirred with the aid of a mechanical stirrer to mix the dry pigment powder, water and sulfonated polyester emulsion resin solution mixture. The resultant pigment mixture was predispersed for about 3 hours in a Union Process Type 01 laboratory attritor (Union Process, USA) operating at a speed of about 350 revolutions per minute using 6 millimeter diameter stainless steel balls. The resulting predispersed pigment mixture was then poured into the feed hopper of a Rannie Lab 2000 homogenizer (APV Homogenizer Group, USA). The homogenizer was turned on to pump the pigment mixture through the homogenizer at a rate of about 11 liters per hour. The product was collected in a product container wherein the container was cooled by means of an ice bath. Initially, the homogenizer primary and secondary valves were kept fully open. When the pigment mixture was being pumped steadily through the homogenizer, the homogenizer primary valve was partially closed to increase the pressure drop in the valve to about 50 megapascals. When the feed hopper was nearly empty, the homogenized product in the product container was poured back into the feed hopper, and the homogenizer primary valve was further closed to increase the pressure drop in the valve to about 100 megapascals. When the feed hopper was nearly empty, the homogenized product in the product container was poured back into the feed hopper, and the homogenizer primary valve was further closed to increase the pressure drop in the valve to a final set point of about 150 megapascals. In total, the pigment mixture was pumped through the homogenizer 28 times at 150 megapascals pressure. At the completion of homogenization, the homogenizer primary valve was opened and the homogenizer was disengaged.

The product was comprised of a stabilized pigment dispersion comprising about 23.3 percent by weight of Pigment Red 122 pigment and about 64.9 percent by weight of sulfonated polyester resin as measured gravimetrically utilizing a hot plate where the ratio of the resin to pigment being about 18 parts per hundred as determined by liquid chromatography, capillary electrophoresis and gas chromatography. The pigment particles of the dispersion had a volume median diameter of about 135 nanometers and volume 90th percentile diameter of about 253 nanometers as determined by a Microtrac UPA 150 particle size analyzer.

EXAMPLE VIII
Preparation of a Magenta Pigment Dispersion II:
240 Grams of Pigment Red 185 powder (Clariant, USA), 360 grams of sulfonated polyester emulsion resin solution of Example II containing about 43.2 grams of the sulfonated polyester resin, and 600 grams of deionized water were dispensed into a beaker and stirred with the aid of a mechanical stirrer to mix the dry pigment powder, water and the sulfonated polyester emulsion resin solution mixture. The resultant pigment mixture was predispersed for about 3 hours in a Union Process Type 01 laboratory attritor (Union Process, USA) operating at a speed of about 350 revolutions per minute using 6 millimeter diameter stainless steel balls. The resulting predispersed pigment mixture was then poured into the feed hopper of a Rannie Lab 2000 homogenizer (APV Homogenizer Group, USA). The homogenizer was turned on to pump the pigment mixture through the homogenizer at a rate of about 11 liters per hour. The product was collected in a product container wherein the container was cooled by means of an ice bath. Initially, the homogenizer primary and secondary valves were kept fully open. When the pigment mixture was being pumped steadily through the homogenizer, the homogenizer primary valve was partially closed to increase the pressure drop in the valve to about 50 megapascals. When the feed hopper was nearly empty, the homogenized product in the product container was poured back into the feed hopper, and the homogenizer primary valve was further closed to increase the pressure drop in the valve to about 100 megapascals. Again, when the feed hopper was nearly empty, the homogenized product in the product container was poured back into the feed hopper, and the homogenizer primary valve was further closed to increase the pressure drop in the valve to a final set point of about 150 megapascals. When the feed hopper was nearly empty, the homogenized product in the product container was poured back into the feed hopper to continue homogenizing the pigment mixture at the same valve pressure drop. In total, the pigment mixture was pumped through the homogenizer 28 times at 150 megapascals pressure. At the completion of homogenization, the homogenizer primary valve was opened and the homogenizer was disengaged.

The product was comprised of a stabilized pigment dispersion comprising of about 23.5 percent by weight of Pigment Red 185 pigment and about 64.9 percent by weight of sulfonated polyester resin as measured gravimetrically utilizing a hot plate where the ratio of the resin to pigment was about 18 parts per hundred as determined by liquid chromatography, capillary electrophoresis and gas chromotography. The pigment particles of the dispersion had a volume median diameter of about 215 nanometers and volume 90th percentile diameter of about 319 nanometers as determined by a Microtrac UPA 150 particle size analyzer.

EXAMPLE IX
A 6 Micron Cyan Toner Comprised of a Polyester Resin, 6 Percent Pigment Blue 15:3, and 9 Percent Carnauba Wax:
A 2 liter emulsion solution containing 12 percent by weight of the sodio sulfonated polyester resin of Example I was charged into a 4 liter kettle equipped with a mechanical stirrer. To this were added 56.4 grams of a dispersion containing 30 percent by weight of Pigment Blue 15:3 (Example VI), and 130 grams of a 19.5 percent solution of Carnauba wax dispersion (Example V). The resulting mixture was heated to 52° C. with stirring at about 180 to about 200 revolutions per minute. To this heated mixture was then added dropwise 300 grams of an aqueous solution containing 5 percent by weight of zinc acetate. The dropwise addition of the acetate salt solution was accomplished utilizing a pump, at a rate of addition at about 3 milliliters per minute. After the addition was complete (about 2.5 hours), the kettle temperature was raised to about 56° C. and maintained at this temperature for an additional 3 hours. A sample (about 2 grams) of the reaction mixture was then retrieved from the kettle, and a particle size of 6 microns with a GSD of 1.23 was measured by the Coulter Counter. The mixture was then allowed to cool to room temperature, about 25° C., overnight, about 18 hours (with stirring). The product was filtered off, washed twice with deionized water, and freeze dried to afford 270 grams of cyan toner. The toner resulting was comprised of 6 percent by weight of Pigment Blue 15:3, 9 percent by weight of Carnauba wax, 85 percent by weight of the polyester resin of the zinc salt complex of copoly(1,2-propylene-dipropylene-5-sulfoisophthalate)-copoly(1,2-propylene-dipropylene terephthalate), and 13.7 percent by weight of a shell, believed to be from about 0.1 to about 0.5 micron in thickness, and comprised of a second polyester resin of the zinc salt of copoly(1,2-propylene-dipropylene-5-sulfoisophthalate)-copoly(1,2-propylene-dipropylene terephthalate).

Other embodiments and modifications of the present invention may occur to those skilled in the art subsequent to a review of the information presented herein, these embodiments and modifications, as well as equivalents thereof, are also included within the scope of this invention.

What is claimed is:

1. A surfactant-free toner process comprised of coalescing by heating in water a coagulant, a polyester resin emulsion, a wax emulsion stabilized with said polyester emulsion and a colorant dispersion stabilized by said polyester emulsion.

2. A process in accordance with claim 1 wherein said polyester of said emulsion is a hydrophilic sulfonated polyester resin of the formula

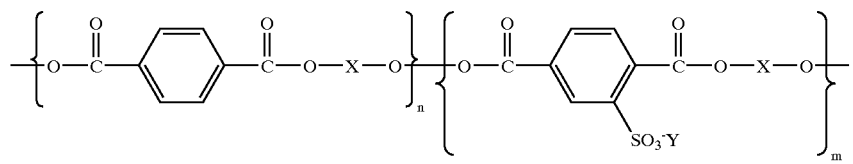

wherein Y is an alkali metal, X is selected from the group consisting of an alkylene and an oxy alkylene, and n and m represent the number of segments.

3. A process in accordance with claim 2 wherein each of n and m represent a number of from about 3,000 to about 7,000.

4. A process in accordance with claim 2 wherein each of said alkylene and said oxyalkylene contains from about 2 to about 20 carbon atoms.

5. A process in accordance with claim 2 wherein said Y alkali is sodium, lithium, potassium, rubidium, cesium, or mixtures thereof.

6. A process in accordance with claim 2 wherein said polyester is selected from the group consisting of sodio copoly(1,2-propylene-dipropylene-5-sulfoisophthalate)-copoly(1,2-propylene-dipropylene terephthalate), lithio copoly(1,2-propylene-diethylene-5-sulfoisophthalate)-copoly(1,2-propylene-diethylene terephthalate), potasio copoly(1,2-dipropylene-5-sulfoisophthalate)-copoly(1,2-propylene terephthalate), sodio copoly(1,3-butylene-5-sulfoisophthalate)-copoly(1,3-butylene terephthalate), lithio copoly(1,2-dipropylene-5-sulfoisophthalate)-copoly(1,2-propylene terephthalate), potasio copoly(1,3-butylene-5-sulfoisophthalate)-copoly(1,3-butylene terephthalate), sodio copoly(1,2-propylene-diethylene-5-sulfoisophthalate)-copoly(1,2-propylene-diethylene terephthalate), lithio copoly(1,2-dipropylene-5-sulfoisophthalate)-copoly(1,2-propylene terephthalate), potasio copoly(1,3-butylene-5-sulfoisophthalate)-copoly(1,3-butylene terephthalate), and sodio copoly(1,2-dipropylene-5-sulfoisophthalate)-copoly(1,2-propylene terephthalate), potasio copoly(1,3-butylene-5-sulfoisophthalate)-copoly(1,3-butylene terephthalate).

7. A process in accordance with claim 2 wherein said polyester resin has a number average molecular weight of from about 2,000 to about 100,000 grams per mole, a weight average molecular weight of from about 4,000 to about 300,000 gram per mole, and a polydispersity of from about 2 to about 30.

8. A process in accordance with claim 2 wherein said polyester resin has a glass transition temperature of from about 45° C. to about 70° C.

9. A process in accordance with claim 2 wherein alkylene is ethylene, propylene, or butylene.

10. A process in accordance with claim 2 wherein each of n and m are from about 20 to about 10,000, and wherein n represents from about 90 to about 98 percent of the total of the sum of n plus m, and m represents from about 3 to about 10 percent of the total of the sum of n plus m.

11. A process in accordance with claim 2 wherein oxyalkylene is ethylene oxy ethylene, propylene oxy propylene, or butylene oxy butylene.

12. A process in accordance with claim 1 wherein the wax is a Carnauba wax, a paraffin wax, a montan wax, a microcrystalline polyethylene wax, a polybutylene wax, a polyethylene-acrylic wax, a polyester wax, a polyamide wax, a Fischer-Tropasch wax, or mixtures thereof.

13. A process in accordance with claim 1 wherein said coagulant is selected from the group consisting of sodium chloride, sodium bromide, sodium iodide, sodium fluoride, sodium acetate, sodium acetoacetate, lithium chloride, lithium bromide, lithium iodide, lithium fluoride, lithium acetate, lithium acetoacetate, potassium chloride, potassium bromide, potassium iodide, potassium fluoride, acetate, potassium acetoacetate, rubidium bromide, rubidium chloride, rubidium iodide, rubidium fluoride, rubidium acetate, rubidium acetoacetate, cesium bromide, cesium chloride, cesium iodide, cesium fluoride, cesium acetate, cesium acetoacetate, bromide, chloride, iodide, fluoride, acetate, acetoacetate, beryllium bromide, beryllium chloride, beryllium iodide, beryllium fluoride, beryllium acetate, beryllium acetoacetate, magnesium bromide, magnesium chloride, magnesium iodide, magnesium fluoride, magnesium acetate, magnesium acetoacetate, calcium bromide, magnesium chloride, magnesium iodide, magnesium fluoride, magnesium acetate, magnesium acetoacetate, barium bromide, barium chloride, barium iodide, barium fluoride, barium acetate, barium acetoacetate, strontium bromide, strontium chloride, strontium iodide, strontium fluoride, strontium acetate, strontium acetoacetate, zinc bromide, zinc chloride, zinc iodide, zinc fluoride, zinc acetate, zinc acetoacetate, copper bromide, copper chloride, copper iodide, copper fluoride, copper acetate, copper acetoacetate, manganese bromide, manganese chloride, manganese iodide, manganese fluoride, manganese acetate, manganese acetoacetate, chromium bromide, chromium chloride, chromium iodide, chromium fluoride, chromium acetate, chromium acetoacetate, iron bromide, iron chloride, iron iodide, iron fluoride, iron acetate, iron acetoacetate, vanadyl bromide, vanadyl chloride, vanadyl iodide, vanadyl fluoride, vanadyl acetate, and vanadyl acetoacetate.

14. A process in accordance with claim 1 wherein the colorant is a cyan, black, magenta, yellow or mixtures thereof with from about 20 to about 60 weight percent solids.

15. A process in accordance with claim 1 wherein said colorant is carbon black.

16. A process in accordance with claim 1 wherein said colorant is a dye.

17. A process in accordance with claim 1 wherein said colorant is a pigment.

18. A process in accordance with claim 1 wherein said colorant is comprised of a mixture of a pigment and a dye.

19. A process in accordance with claim 1 wherein the polyester possesses a size diameter of from about 10 about 500 nanometers, and wherein said polyester is copoly(1,2-propylene-dipropylene-5-sulfoisophthalate)-copoly(1,2-propylene-dipropylene terephthalate), the magnesium salt of copoly(1,2-propylene-diethylene-5-sulfoisophthalate)-copoly(1,2-propylene-diethylene terephthalate), the calcium salt of copoly(1,2-propylene-dipropylene-5-sulfoisophthalate)-copoly(1,2-propylene-dipropylene terephthalate), or the barium salt of copoly(1,2-propylene diethylene-5-sulfoisophthalate)-copoly(1,2-propylene-diethylene terephthalate).

20. A process in accordance with claim 1 wherein heating is accomplished at a temperature of from about 50° C. to about 95° C.

21. A process in accordance to claim 1 wherein the polyester emulsion is prepared by heating the sulfonated polyester in water at a temperature of from about 75° C. to about 95° C.

22. A process in accordance with claim 1 wherein subsequent to said heating there is generated a toner.

23. A process in accordance with claim 1 wherein the coagulant is added over a period of about 2 to about 8 hours.

24. A process in accordance as with claim 1 wherein the wax emulsion stabilized by the polyester emulsion is obtained by homogenizing at from about 1,000 pounds per square inch to about 8,000 pounds per square inch for a duration of about 30 to about 90 minutes the wax with an emulsion solution of a hydrophilic polyester resin, and which resin is selected in an amount of about 5 to about 10 percent by weight of wax.

25. A process in accordance with claim 1 wherein the colorant dispersion stabilized by the polyester emulsion is obtained by homogenizing at 1,000 pounds per square inch to 8,000 pounds per square inch the colorant with an emulsion solution of a hydrophilic polyester resin and which resin is selected in an amount of about 5 to about 10 percent by weight of wax.

26. A process in accordance with claim 1 wherein the colorant dispersion possesses minimum or substantially no agglomeration, or settling of colorant.

27. A process in accordance with claim 1 wherein the wax emulsion stabilized by the polyester emulsion possesses a particle size diameter of about 5 to about 500 nanometers.

28. A process in accordance with claim 1 wherein the polyester emulsion possesses a particle size diameter of from about 5 to about 300 nanometers.

29. A process in accordance with claim 1 wherein the toner obtained possesses a particle size volume average diameter of from about 3 to about 9 microns.

30. A process in accordance with claim 1 wherein said polyester is the sodio salt of (1,2-propylene-dipropylene-5-sulfoisophthalate)-copoly(1,2-propylene-dipropylene terephthalate).

31. A process comprised of coalescing by heating a coagulant, a polyester resin emulsion, a wax emulsion stabilized with said polyester emulsion, and a colorant dispersion stabilized by said polyester emulsion.

32. A toner process comprised of coalescing by heating a coagulant, a polyester resin emulsion, a wax emulsion stabilized with said polyester emulsion, and a colorant dispersion stabilized by said polyester emulsion, and wherein said polyester is a sulfonated polyester resin of the formula

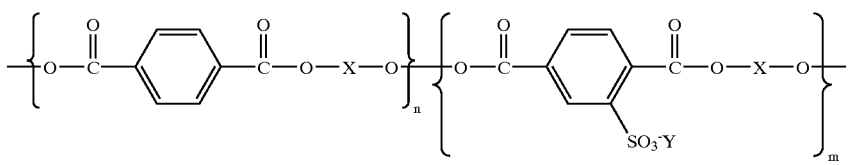

wherein Y is an alkali metal, X is selected from the group consisting of an alkylene and an oxy alkylene, and n and m represent the number of segments.

* * * * *